Patented Sept. 27, 1932

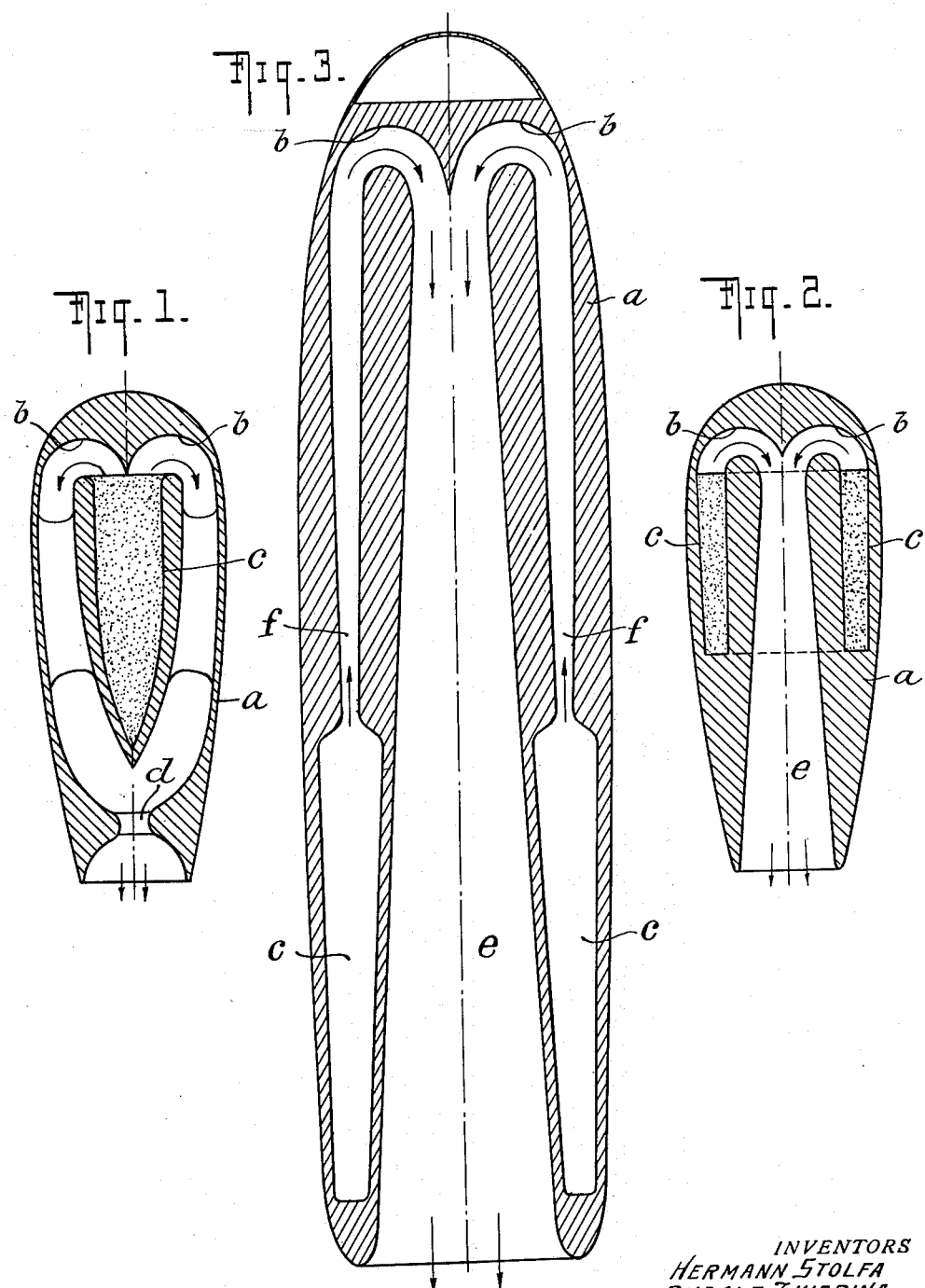

1,879,579

UNITED STATES PATENT OFFICE

HERMANN STOLFA AND RUDOLF ZWERINA, OF VIENNA, AUSTRIA, ASSIGNORS OF ONE-SIXTH TO KARL POHL AND ONE-SIXTH TO GUSTAVE I. JAHR, BOTH OF NEW YORK, N. Y.

ROCKET

Application filed October 4, 1930, Serial No. 486,303, and in Austria October 25, 1929.

Our invention relates to a rocket which may find its application in signalling or as a pyrotechnic display device. The invention contemplates the more complete utilization for the propulsion of the rocket body of the energy of gases produced within the rocket by the combustion of substances contained within such rocket than has been possible with existing forms of rockets.

An object of the invention is to provide a rocket which is constructed in a manner to yield the maximum amount of energy to be used for its projection by increasing the efficiency of energy development. Such increase in efficiency is, broadly speaking, obtained by utilizing, in addition to the reaction energy obtained from the jet of gases of combustion, the considerable impulse energy of such jet which may be harnessed by the specific means hereinafter described. It is to be noted that in rockets of the existing type and construction, based upon the principle of utilization of the reaction of the jet of gases generated from the rocket propulsion composition against the air behind the rocket body, only a partial, and therefore inadequate, utilization of the effective energy of such gases is obtained, resulting in a low degree of efficiency.

It is well known that a jet of liquid or gas, when deflected from its original direction by 180°, will yield a force in the direction of the non-deflected jet, which, disregarding the resistance caused by friction, is twice as great as that force which the same jet, when not deflected, would exert upon a plane placed in the path of the jet, at right angles thereto. For example, when a jet of fluid issues from a nozzle and impinges upon a flat surface opposite the nozzle opening, there is a force upon the flat surface tending to move it away from the nozzle. This force is the "impulse" energy of the jet. As the jet issues from the nozzle, it exerts at the same time, a reaction on the walls of the nozzle, or on the tank to which it is attached. When then, the fluid from the nozzle impinges against a curved surface, and before it leaves such surface, is turned back upon itself through an angle of 180°, the surface is acted on by two forces simultaneously, both tending to move it in the same direction. When the jet first strikes the surface an impulse force tends to move it, and when leaving, there is acting in a backward direction a reaction equal to the impulse. If the jets impinging against the flat surface and the surface having a curvature of 180°, have the same velocity and density, and frictional losses are neglected, the pressure on the curved surface will be twice as great as on the flat surface. When frictional losses due to contact with the direction-reversing surface is taken into account, this increase in the yield of energy is reduced to 1.7 times the force that would be exerted by the jet without deflection.

In its broadest aspect, our invention comprises a rocket in which the products of combusion of the combustible mixture are caused to impact against a deflecting plane placed in the path of the gases so as to deflect the same 180° from their original path as they emerge from the combustion area.

Our invention is capable of application to rockets both of the type which are provided merely with a circular exhaust orifice, i. e. those not provided with a nozzle element and of the type provided with nozzles. We have found that in the latter type, i. e., rockets equipped with nozzles, the increased yield of energy which is obtained by deflection of the gas jet hereinabove referred to, never reaches that degree which is obtained in rockets equipped with deflection surfaces though not provided with nozzles. The obtaining of a smaller amount of increase of energy with rockets without nozzles but having deflection surfaces may be explained by the low velocity of the outrushing gases in front of the deflection surface.

A second feature of our invention contemplates the provision of rockets of the type described immediately hereinabove, i. e., rockets equipped with nozzles and deflection surfaces, with restricted channels between the combustion chamber and deflection surfaces, which restricted channels will cause the discharge velocity of the gases to be multiplied in front of the deflection planes.

In the accompanying drawing in which various modifications of our invention are illustrated as applied to various forms of rockets, Fig. 1 is a cross-section through a rocket of the type having a circular exhaust orifice provided with deflection surfaces in accordance with our invention;

Fig. 2 is a cross-section through a rocket of the type equipped with a nozzle provided with deflection surfaces to utilize the principle of the deflected gas streams for obtaining the increased energy yield hereinabove described;

Fig. 3 illustrates the embodiment, in a rocket of the nozzle equipped type, of the two features of our invention, i. e., the deflection of the gases and their constriction by narrow channels in front of the deflecting surfaces.

Referring more particularly to the drawing, in which similar reference characters identify similar parts in the several views, $a$ is the outer casing, $b$ the deflection surface, $c$ the combustible material chamber, $d$ the exhaust orifice, $e$ the nozzle (in the figures illustrating the nozzle type of rocket), and $f$ the constricted channel between the chamber $c$ and the deflection surface $b$.

In Fig. 1, we have shown the principle of utilization of both the reaction and impulse energy of the jet of gases issuing from chamber $c$ upon the combustion of the substances contained therein, as applied to the type of rocket having a circular exhaust orifice $d$ as distinguished from the nozzle-equipped rocket illustrated in Figs. 2 and 3. A smaller increase in energy in rockets built according to Fig. 1 as compared with rockets of the nozzle type is obtained because of the low velocity of the outrushing gases produced by the burning of the combustible composition in front of the deflecting surface, the ratio of increase depending upon the discharge velocity of the gases constituting the jet.

According to the present invention, this smaller increase is compensated by equipping a rocket, provided with a nozzle and deflecting surfaces, with additional restricted channels $f, f$, which cause the discharge velocity of the combustion gases to be multiplied in front of the deflecting planes, thereby bringing about a many times greater energy yield than can be attained in rockets not provided with such constricted channels. However, since the speed of the gases in issuing from the combustion chamber is, in all cases, dependent upon the rate of combustion within such chamber, the use of special combustible substances characterized by high combustion speeds, may obviate the necessity for a restricted passageway between the chamber and deflecting surface. An undesirably large increase in speed of the gases may even be produced, so that we have provided, as in Figs. 1 and 2, rockets in accordance with our invention, in which no restricted passages are provided between the combustion chamber and deflecting surface.

A still further feature of our invention is the arrangement of the chambers $c$ (Fig. 3) of such configuration that the combustion of the materials contained therein take place always directly in front of the opening to the constricted channel $f$, i. e., the charge of combustible material contained in the chamber $c$ will be, throughout the period during which combustion thereof takes place, located immediately in front of, and in line with, the constricted passageway $f$. In the devices of the prior art, the disadvantages of a construction in which the combustion point or area recedes constantly away from the orifice as the combustible material is burned, are sought to be eliminated by the provision of a disc positioned behind the charge and pressed forward by a spring as the combustible material is used up. In accordance with our invention, the necessity for such arrangement is eliminated by making the combustion chamber of such configuration that the combustion point is at all times immediately in front of, and in line with, the mouth of the constricted passageway into which the gases of combustion are exhausted from the combustion chamber. Thus, the combustion takes place progressively immediately in front of such passageway or channel, eliminating great losses in energy due to friction when the gases must pass through long distances as the combustible material is burned, before reaching the channel $f$ or to the lowering of the energy of the gases due to a large combustion space.

While we have described embodiments of our invention in rockets in which a single passageway or nozzle outlet is illustrated, it is obvious that our invention is equally applicable to types of rockets in which a plurality of such passageways are utilized with either a single magazine chamber or a plurality of such chambers, each one discharging its gases of combustion into its own nozzle. The energy yield of rockets in accordance with our invention may thus be increased by arranging between the combustion chamber and the deflection surfaces on the one hand, and the deflection surfaces and the exhaust orifice on the other hand, one or more nozzle shaped passageways.

We claim:

1. A rocket comprising an outer casing, a combustible substance chamber, an orifice, and a passageway between said chamber and orifice provided with a deflecting surface whereby the gases produced within the rocket by the burning of the combustible substance will be deflected substantially 180° from the path taken when issuing from said chamber, said passageway being of a reduced cross-section through a portion of its length adjacent said chamber for causing the discharge velocity of the gases of combustion to be multiplied in front of the deflecting surface.

2. A rocket of the type equipped with a tapering nozzle, comprising an outer casing, a combustible charge, a combustion chamber therefor, and a passageway between said chamber and nozzle having a deflecting surface whereby the gases produced within the rocket by the burning of the combustible substance will be deflected substantially 180° from the path taken when issuing from said chamber.

3. A rocket of the type equipped with a nozzle, comprising an outer casing, a combustible charge, a combustion chamber therefor, and a passageway between said chamber and nozzle having a deflecting surface whereby the gases produced within the rocket by the burning of the combustible substance will be deflected substantially 180° from the path taken when issuing from said chamber, said passageway being of a reduced diameter through a portion of its length between said chamber and said deflecting surface.

4. A rocket comprising an outer casing, a charge of combustible material, a combustion chamber therefor, a gas outlet, and a passageway between said chamber and outlet provided with a deflecting surface and being of a reduced cross-section through a portion of its length between said chamber and deflecting surface, the combustion chamber being of such configuration that the charge of combustible material contained therein will be, throughout the period during which combustion thereof takes place, located immediately in front of, and in line with, the constricted area of said passageway.

5. A rocket of the type equipped with a nozzle, comprising an outer casing, a combustible charge, a combustion chamber therefor, and a passageway between said chamber and nozzle having a deflecting surface whereby the gases produced within the rocket by the burning of the combustible substance will be deflected substantially 180° from the path taken when issuing from said chamber, the interior of said passageway increasing uniformly in cross-section from said chamber to said deflecting surface.

HERMANN STOLFA.
RUDOLF ZWERINA.